US007816796B2

(12) United States Patent

Leufen et al.

(10) Patent No.: US 7,816,796 B2

(45) Date of Patent: Oct. 19, 2010

(54) HAND-HELD POWER TOOL AND METHOD FOR OPERATING A HEATING DEVICE OF A HAND-HELD POWER TOOL

(75) Inventors: Heinrich Leufen, Schwaikheim (DE); Rolf Walter, Waiblingen (DE); Fried Berkenkamp, Allmersbach (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 544 days.

(21) Appl. No.: 11/836,162

(22) Filed: Aug. 9, 2007

(65) Prior Publication Data

US 2008/0036429 A1 Feb. 14, 2008

(30) Foreign Application Priority Data

Aug. 11, 2006 (DE) ...................... 10 2006 037 572

(51) Int. Cl.
*F01K 15/00* (2006.01)
*F02C 6/00* (2006.01)
*H02K 7/18* (2006.01)
*H02P 9/00* (2006.01)

(52) U.S. Cl. ............................. 290/2; 290/1 A; 322/44

(58) Field of Classification Search ..................... 290/2, 290/9, 1 A; 123/2, 3; 322/44

See application file for complete search history.

(56) References Cited

U.S. PATENT DOCUMENTS

| | | | | |
|---|---|---|---|---|
| 2,339,903 | A * | 1/1944 | Alexander | 165/43 |
| 3,678,284 | A * | 7/1972 | Peters | 290/1 R |
| 3,916,865 | A * | 11/1975 | Kiencke et al. | 123/198 DB |
| 4,024,850 | A * | 5/1977 | Peter et al. | 123/198 F |
| 4,065,055 | A * | 12/1977 | De Cosimo | 237/12.1 |
| 4,150,300 | A * | 4/1979 | Van Winkle | 290/2 |
| 4,423,307 | A * | 12/1983 | Kondo et al. | 219/202 |
| 5,832,178 | A * | 11/1998 | Schave | 392/472 |
| 6,232,672 | B1 * | 5/2001 | Leufen et al. | 290/1 A |
| 7,081,686 | B2 * | 7/2006 | Yang | 290/1 R |
| 2004/0178641 | A1 * | 9/2004 | Wall | 290/52 |
| 2006/0037338 | A1 * | 2/2006 | Kim et al. | 62/238.7 |
| 2006/0138778 | A1 * | 6/2006 | Braun et al. | 290/38 R |

* cited by examiner

*Primary Examiner*—Julio C. Gonzalez
(74) *Attorney, Agent, or Firm*—Gudrun E. Huckett

(57) ABSTRACT

A hand-held power tool has a drive motor driving a tool and a generator. One or more heating devices having one or more heating elements are provided. The generator supplies the one or more heating devices with energy. A control device controls a power supplied to the one or more heating elements as a function of at least one operating parameter of the drive motor.

18 Claims, 5 Drawing Sheets

HAND-HELD POWER TOOL AND METHOD FOR OPERATING A HEATING DEVICE OF A HAND-HELD POWER TOOL

BACKGROUND OF THE INVENTION

The invention relates to a hand-held power tool comprising a drive motor for driving a tool and a generator, wherein the power tool has at least one heating device with at least one heating element and wherein the generator provides the power for operating the heating device. The invention further relates to a method for operating a heating device of a hand-held power tool of the aforementioned kind.

U.S. Pat. No. 6,232,672 B1 discloses a hand-held power tool whose drive motor drives a generator. The generator provides the power for operating a heating device.

The power generated by the generator varies as a function of the engine speed. At low engine speed only minimal power is available; at high engine speed a lot of power is available. The heating element must be designed such that at low engine speed a sufficient heating action is provided so that, for example, in the case of a carburetor heater, freezing of ambient moisture at the carburetor is prevented. At high engine speed, it must be ensured that no overheating occurs because, in the case of a carburetor heater, overheating causes the generation of vapor bubbles leading to an instable operation of the internal combustion engine.

For controlling the temperature, in known heating devices temperature switches, for example, bimetallic switches, are used. In order to measure the heat in the part to be heated, the temperature switch must have a certain spacing from the heating element itself. In this way, the temperature switch responds sluggishly. In operation of the heating element at very high power, for example, at full load of the drive motor, as a result of the sluggish response of the temperature measurement no satisfactory temperature control can be achieved. In the case of a carburetor heater, disruptions can occur before the temperature switch responds when the heating element is operated at very high power.

SUMMARY OF THE INVENTION

It is an object of the present invention to provide a hand-held power tool of the aforementioned kind whose heating device across the entire engine speed range provides a substantially uniform heating power. A further object of the invention resides in that a method for operating a heating device of a hand-held power tool is to be provided that enables a sensitive control of the heating device.

According to the present invention, this is achieved in connection with the power tool in that the power tool has a control device for controlling the power supplied to at least one heating element as a function of at least one operating parameter of the drive motor. The control of the power as a function of at least one operating parameter of the drive motor makes it possible to supply an adjusted power to the heating element in different operating states of the drive motor. In this connection, the operating parameter changes advantageously as a function of the engine speed of the drive motor.

Expediently, the operating parameter is the engine speed of the drive motor. In this way it is possible to supply the heating element at low engine speed with a sufficiently high power and to lower at high engine speed the power level so that overheating of the heating element is safely prevented. A control of the power depending on the engine speed can be realized in a simple way. Because lowering the power is carried out in the control device, no constructive changes of the power tool are required.

Advantageously, the heating device has a temperature sensor for a temperature-dependent control of the power supplied to the heating element. In this way, the heating element can be controlled as a function of the engine speed and as a function of the temperature. A simple configuration is provided when the temperature sensor is an NTC (negative temperature coefficient) resistor. Advantageously, the temperature sensor is arranged at a spacing from the heating element. As a result of the spacing between temperature sensor and heating element, the temperature sensor measures the actual heat that is being transferred into the part and not the heat generated at the heating element. As a result of the engine speed-based control of the supplied power, the delay of the temperature measurement that is caused by the spacing between the heating element and the temperature sensor is acceptable because overheating is avoided by an engine speed-based control of the power. As a result of the spacing between the temperature sensor and the heating element, there are more degrees of freedom with regard to the arrangement of the heating element and the temperature sensor which arrangement is usually problematic because of space considerations.

It is provided that the drive motor is an internal combustion engine with a carburetor and that the heating device is a carburetor heater. In the case of a carburetor heater, overheating is critical in regard to the operation of the internal combustion engine. In particular for a carburetor heater an engine speed-based control of the supplied power is therefore expedient. Advantageously, the temperature sensor is connected by means of a contact surface with the carburetor in a thermally conducting way. In order to eliminate as much as possible effects of the environment on the temperature measurement, it is provided that the temperature sensor has a cover that thermally shields the temperature sensor relative to the environment with the exception of the thermally conducting connection through the contact surface. The temperature sensor measures thus essentially only the heat that is transmitted from the carburetor via the contact surface. The cover is advantageously a cap made from plastic material. Plastic material has satisfactory properties for thermal insulation. A cap made of plastic material can be produced in a simple way and has only a minimal weight. Advantageously, the control device and the temperature sensor are arranged on a common support and the cover is attached to the support by a snap-on connection. The cover provides at the same time a mechanical protection for the control device and the temperature sensor with regard to damage and soiling.

It is provided that the power tool has at least one handle for guiding the power tool and that the heating device is a handle heater. It can be provided that the handle heater is also controlled as a function of the engine speed of the internal combustion engine. The handle heater can also be controlled based on temperature. The handle heater can be switched on and off, additionally or exclusively, by a switch to be operated by the operator.

In a method for operating a heating device of a hand-held power pool that comprises a drive motor, wherein the drive motor drives a generator and a tool, wherein the generator provides the power for operating the heating device and wherein the heating device has at least one heating element, it is provided according to the present invention that the power for operating the at least one heating element is controlled as a function of at least one operating parameter of the drive motor.

In this way, an adjustment of the power for operating the heating element that is based on the operating state of the drive motor can be realized.

Advantageously, the operating parameter is the engine speed of the drive motor. The engine speed-dependent control of the power for operating the heating element enables an adjustment of the engine speed-dependent generator power to the heating element. In this way, it can be achieved that sufficient power is available at low engine speed while at higher engine speed an excessive power supply to the heating element is prevented.

Expediently, the engine speed of the drive motor is derived from the voltage signal of the generator. In this connection, it must only be determined whether the current engine speed is above or below a limit value of the engine speed. This can be done electronically in a simple way. The power for operating the heating element is reduced in particular when surpassing a limit value. This engine speed can be preset in a control device. Advantageously, the power for operating the heating element is controlled as a function of a temperature measured by a temperature sensor. The temperature-dependent control is realized in particular independent of the engine speed-based control of the power.

It is provided that the generator generates an alternating voltage signal with which the heating element is operated. Advantageously, a control of the power is realized in that above a limit value every other half wave of the alternating voltage is blocked. The blocked half wave is not used for operating the heating element. Below the limit value, for example, an engine speed limit, each half wave of the induced voltage is transmitted to the heating element. Above the limit value, blocking of every other half wave can be realized by means of an actively controllable element, for example, a thyristor or a triac or a similar device that transmits only positive or only negative half waves to the heating element. In this way, a sufficiently great reduction of the power made available to the heating element can be achieved by simple means. Advantageously, control is done by phase control. In this connection, the engine speed-based control as well as the temperature-based control can be realized by means of blocking every other half wave of the alternating voltage signal and/or by means of phase control.

DESCRIPTION OF THE PREFERRED EMBODIMENTS

Figure 1:
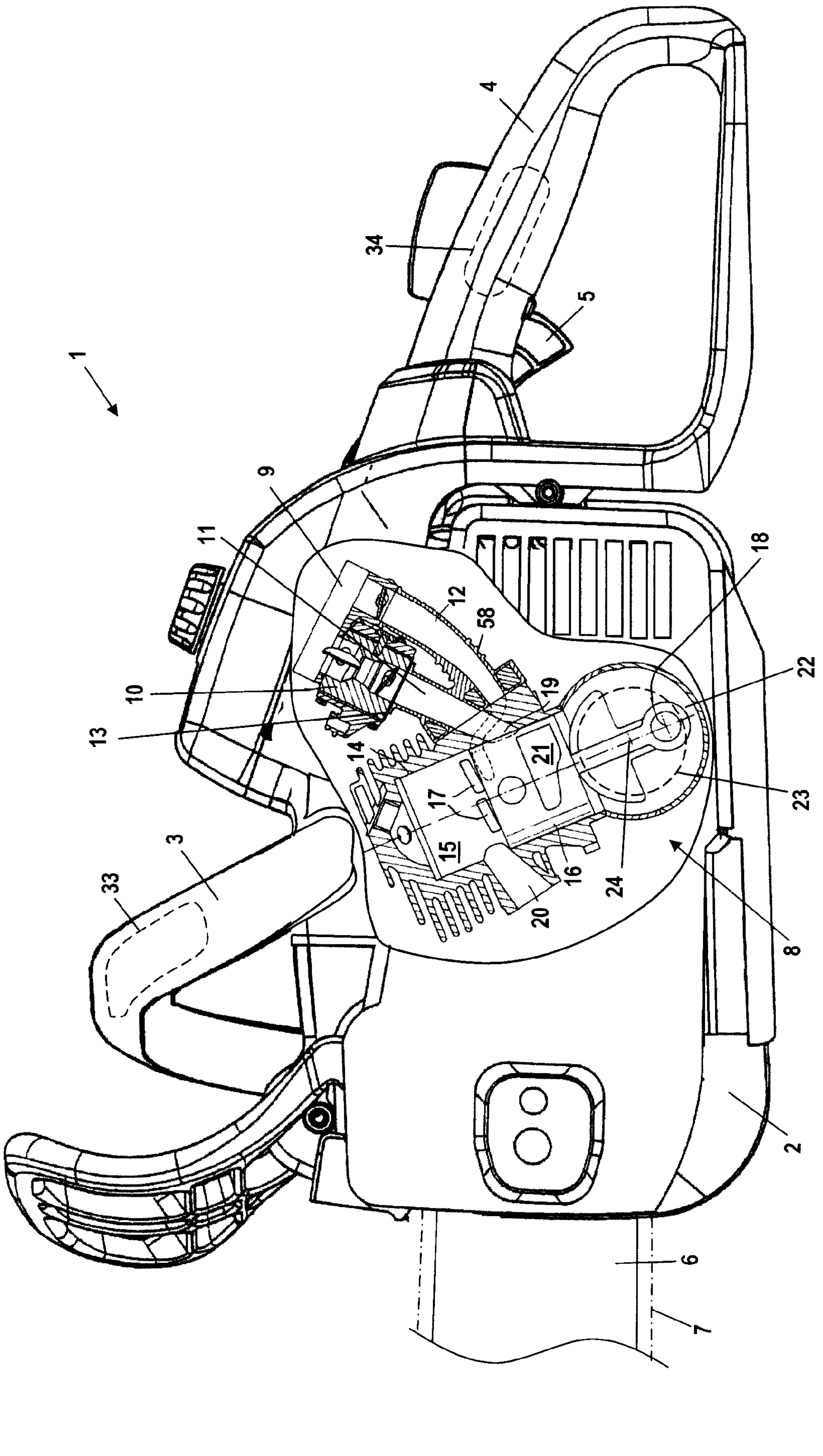
FIG. 1 is a schematic illustration of a hand-held power tool with a drive motor.

FIG. 1 shows a hand-held power tool, in this case a motor chain saw 1, in a schematic illustration. The hand-held power tool can also be a trimmer or a similar power tool. The motor chain saw 1 has a housing 2 in which a drive motor 8 is arranged. On the housing 2 a rear handle 4 as well as a grip tube 3 are secured. On the end of the housing 2 opposite the rear handle 4, a guide bar 6 projects from the housing 2 and a saw chain 7 is arranged thereon to circulate thereon. On the rear handle 4, a throttle 5 for operating the drive motor 8 is arranged.

The drive motor 8 is a single-cylinder two-stroke engine. The drive motor 8 has a cylinder 14 in which a combustion chamber 15 is provided. The combustion chamber 15 is delimited by a piston 16. The piston 16 drives crankshaft 18 about axis of rotation 24, the crankshaft is rotatably supported in crankcase 22. In the area of the bottom dead center of the piston 16 illustrated in FIG. 1, the crankcase 22 and the combustion chamber 15 are connected to one another by transfer passages 17. The drive motor 8 has an intake 19 for a fuel/air mixture connected to the crankcase 22 as well as an exhaust 20 connected to the combustion chamber 15. The drive motor 8 takes in by means of intake passage 11 the fuel/air mixture via carburetor 10. The carburetor 10 is connected to air filter 9 by means of which the combustion air is taken in. A supply passage 12 opening at the air filter 9 is connected to the cylinder 14 in the area of the piston 16; in the area of the top dead center of the piston 16 the supply passage 12 is connected by means of a piston recess 21 provided at piston 16 to the transfer passages 17. The drive motor 8 takes in scavenging air into the transfer channels 17 via supply passage 12. The carburetor 10 is connected by intake socket 58 to the cylinder 14. Between the carburetor 10 and the intake socket 58 a heating element 13 is arranged on the carburetor 10 for heating the carburetor 10.

In operation, the drive motor 8 takes in the fuel/air mixture into the crankcase 22 through intake passage 11 and substantially fuel-free combustion air is supplied to the transfer passages 17 through supply passage 12. The fuel/air mixture is compressed upon downward movement of the piston 16 in the crankcase 22 and flows through the transfer passages 17 into the combustion chamber 15 as soon as the transfer passages 17 are opened toward the combustion chamber 15 by the piston 16 moving downward toward the crankcase 22. The scavenging air stored in the transfer passages 17 separates the fresh fuel/air mixture being transferred from the crankcase 22 into the combustion chamber 15 from the exhaust gases present within the combustion chamber 15 and scavenged through the exhaust 20. Upon upward movement of the piston 16 the fuel/air mixture in the combustion chamber 15 is compressed and ignited in the area of the top dead center of the piston 16 by a spark plug (not illustrated). Upon downward stroke of the piston 16, the exhaust 20 is opened and the exhaust gases flow out of the combustion chamber 15 and are scavenged by the scavenging air flowing in through the transfer passages 17.

For operating the drive motor 8, a sufficient amount of fuel must be taken in through the intake passage 11. At low temperatures, ambient moisture can deposit and freeze on the carburetor 10. This can impair the function of the carburetor 10.

In order to prevent freezing of the carburetor 10, the heating element 13 is provided. The heating element 13 heats the carburetor 10 at low ambient temperatures. However, the heating element 13 must not heat the carburetor 10 so much that vapor bubbles will form in the carburetor 10. The vapor bubbles can collect in the fuel system of the carburetor 10 configured as a diaphragm carburetor and can thus prevent fuel from being taken in. In this way, the operation of the drive motor is greatly impaired. At the rear handle 4 a heating element 34 is arranged and in the grip tube 3 a heating element 33. A generator 23, schematically illustrated in FIG. 1, is arranged on the crankshaft 24. The generator 23 supplies the heating elements 13, 33, and 34 with electric power. The power supplied by the generator 23 depends on the engine speed of the drive motor 8. With increasing engine speed, the power provided by the generator 23 increases also.

Figure 2:
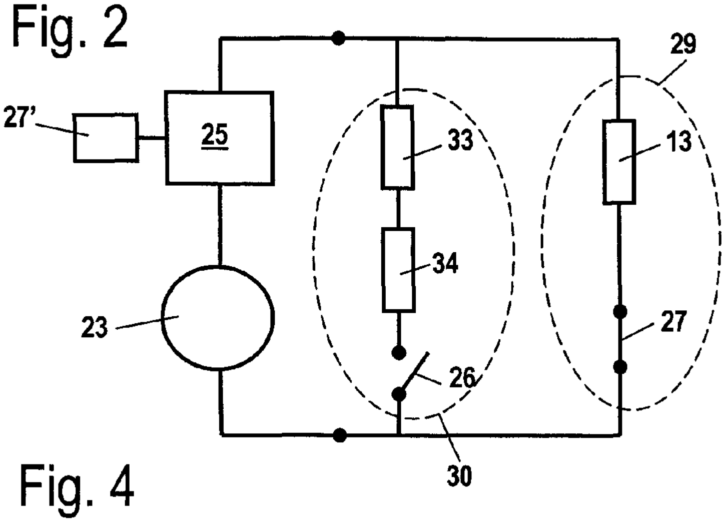
FIG. 2 is a schematic circuit diagram of heating devices of the power tool.
Figure 3:
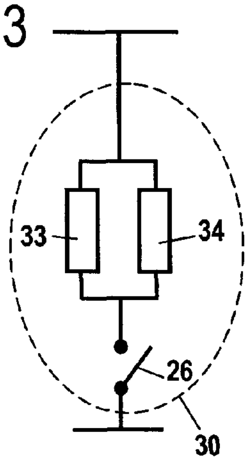
FIG. 3 is a schematic circuit diagram detail of an embodiment of a heating device of the power tool.

In FIG. 2, a circuit diagram of the heating elements 13, 33, and 34 and of the generator 23 is schematically indicated. The heating elements 33 and 34 together with the switch 26 provide a handle heater 30. The heating elements 33 and 34 are serially connected in the embodiment according to FIG. 2. The heating elements 33 and 34 however can also be connected in parallel, in particular, in other power tools such as trimmers or similar power tools. This is illustrated in FIG. 3. The circuit diagram of the heating elements 33 and 34 can be selected based on the arrangement of the handles. The switch 26 can be actuated by the operator. Additionally or alternatively, the switch 26 can be actuated automatically by a temperature sensor or a temperature switch. The heating element 13 together with the temperature sensor 27 provides a carburetor heater 29. The temperature sensor 27 can be connected in series with the heating element 13 as illustrated in FIG. 2. A control device 25 is connected in series to the generator 23. It can also be provided that the temperature sensor 27' is connected directly to the control device 25. Advantageously, the temperature sensor 27, 27' can be an NTC resistor. Instead of a temperature sensors 27, 27' a temperatures switch such as a bimetallic switch or a similar device can be provided.

Figure 4:
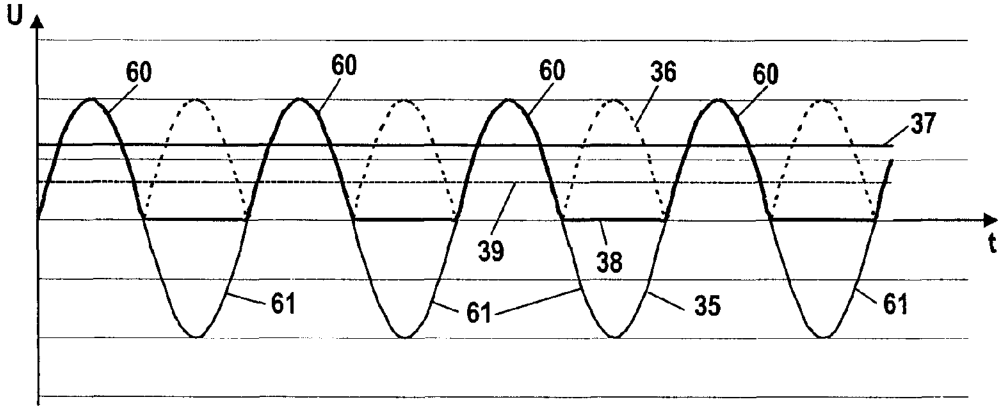
FIG. 4 is a diagram of the voltage curve of the generator voltage plotted against time.

FIG. 4 illustrates the voltage U produced by the generator 23 as generator voltage 35 plotted against time t. The generator 23 supplies a sine-shaped voltage U. For illustration purposes, FIG. 4 also shows in dashed lines the rectified generator voltage 37. The average of this rectified generator voltage 36 is illustrated as average generator voltage 37 in FIG. 4.

Figure 5:
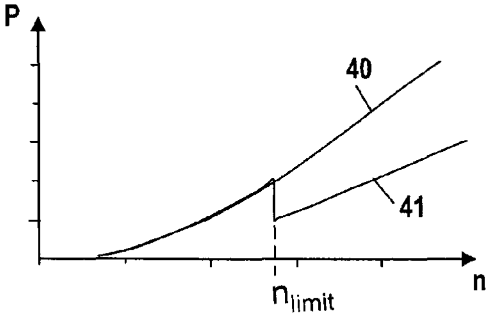
FIG. 5 is a first diagram of a curve of the power supplied to the heating device plotted against the engine speed.

FIG. 5 shows the course of the heating power P when only the carburetor heater 29 is operated. The heating power P is illustrated as curve 40. As shown in FIG. 5, the heating power P will increase greatly as the engine speed n increases. This has the effect that, at high engine speed n, a high power output is supplied to the heating element 13. Already a brief operation of the heating element 13 can lead to overheating of the carburetor 10 and to formation of vapor bubbles. Because the temperature sensor 27 is positioned at a spacing to the heating element 13 at the carburetor 10, the temperature sensor 27 will respond only once the carburetor body has been heated. At this point in time, the carburetor 10 can already have been overheated by the heating element 13. In order to prevent this, it is provided that the power P supplied to the heating element 13 of the carburetor is reduced as a function of the engine speed n. The reduced power P is illustrated in FIG. 5 by curve 41. Beginning at an engine speed limit $n_{limit}$, for example, between 8,000 and 9,000 rpm, the power P is reduced.

Reducing the power P is illustrated in FIG. 4. The sine-shaped generator voltage 35 has a first half wave 60 with positive voltage and a second negative half wave 61 with negative voltage. The reduction of the power supplied to the heating element 13 is achieved in that every other negative half wave 61 is blocked. This results in the voltage signal illustrated by curve 38 in FIG. 4. The curve 38 provides an average generator voltage 39 that is significantly lower than the average generator voltage 37. Blocking the second half wave 61 can be achieved, for example, by an actively controllable element such a thyristor or a triac.

Figure 6:
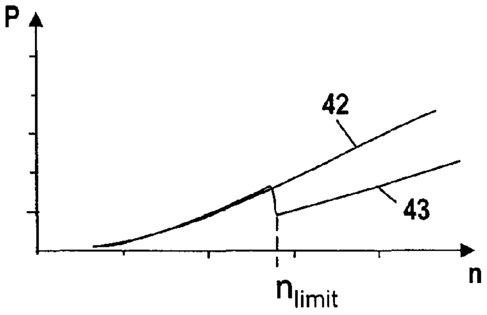
FIG. 6 is a second diagram of a curve of the power supplied to the heating device plotted against the engine speed.

FIG. 6 illustrates the course of the power P at the carburetor heater 29 when the carburetor heater 29 as well as the handle heater 30 are operating. As shown in FIG. 5, the power P increases greatly with increasing engine speed n as illustrated by curve 42. By blocking every other half wave 61 of the generator voltage 35 beginning at an engine speed limit $n_{limit}$, the power above the engine speed limit $n_{limit}$ can be lowered to curve 43. It can be provided that the power (not illustrated) for heating the handle heater 30 is lowered. It can also be provided that the handle heater 30, independent of the engine speed n of the drive motor 8, is supplied with every half wave 60, 61 of the generator voltage 35.

Figure 7:
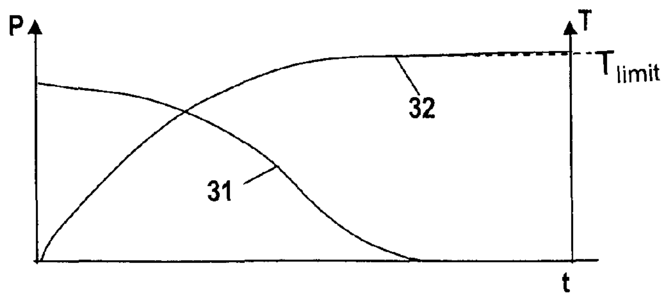
FIG. 7 shows curves of power and temperature of the heating device plotted against time.

In addition to the disclosed engine speed-dependent control of the power P supplied to the heating element 13, a control of the power P of the heating element 13 as a function of the temperature T at the carburetor 10 is provided. This is illustrated in FIG. 7. The curve 31 shows the power P supplied to the heating element 13. The curve 32 shows the course of the temperature T of the carburetor 10 against the time t. As shown in FIG. 7, the temperature T is first low and the heating element 13 is operated at full heating power P. Accordingly, the carburetor 10 is heated in accordance with the curve 32. As soon as the carburetor 10 has reached the preset temperature limit $T_{limit}$, the heating element 13 is switched off. The power P drops to zero. Additional heating of the carburetor 10 can result from a higher ambient temperature, for example, as a result of the engine heat.

Figure 8:
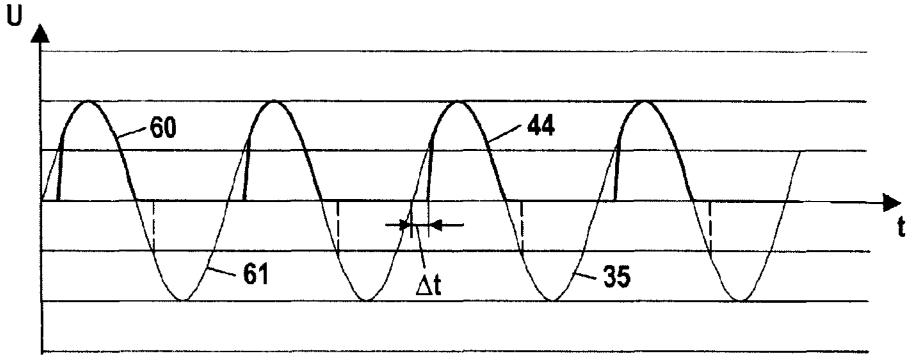
FIG. 8 shows a voltage curve plotted against time.

For controlling the power P as a function of the temperature T, the phase control illustrated schematically in FIG. 8 is provided and is illustrated by curve 44. As a function of the temperature T, the first half wave 60 of the generator voltage 35 is allowed to be supplied to the heating element 13 only after a time difference t has elapsed after passing zero. In this way, the power P supplied to the heating element 13 can be controlled in a simple way. In the case of engine speeds above the engine speed limit $n_{limit}$ every other half wave 61 is blocked. This is illustrated by curve 44. Below the engine speed limit $n_{limit}$ the second half waves 61 are also supplied to the heating element 13. In this case, phase control is also provided for the second half waves 61 as illustrated in FIG. 8 in dashed lines.

It can also be provided that the engine speed-based control of the power P is realized by means of the phase control illustrated in FIG. 8. For the temperature-dependent control of the power P it can also be provided that every other half wave 61 of the generator voltage 35 is blocked. The engine speed-dependent as well as in the temperature-dependent control of the power P can also be controlled by a combined control method according to which phase control as well as blocking of every other half wave 61 of the generator voltage are realized. The combination of the control methods enables an excellent adjustment of the power P.

Figure 9:
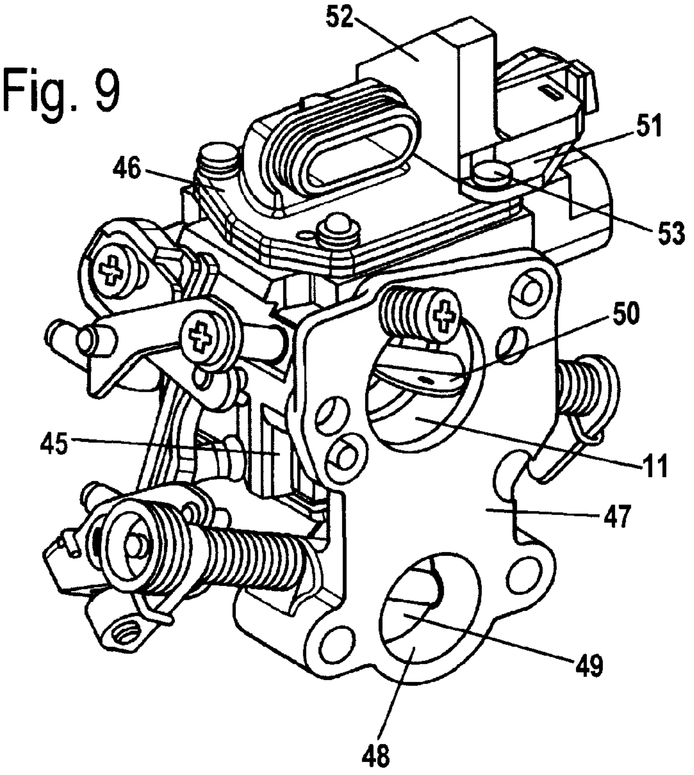
FIG. 9 is a perspective illustration of a carburetor with support and cover for the control device.

In FIG. 9 a carburetor 10 is illustrated. The carburetor 10 has a carburetor body 45 having connected thereto a connecting flange 47. The connecting flange 47 rests against the air filter 9 illustrated in FIG. 1. A supply section 48 of the supply passage 12 is formed on the connecting flange 47 in which a control flap 49 for controlling the scavenging air to be supplied to the transfer passages 17 is provided. A choke 50 is supported in the intake passage 11. Downstream of the choke 50 there is a throttle valve, not illustrated in FIG. 9. At the side of the carburetor body 45 facing away from the supply passage 12, a control chamber cover 46 is arranged that closes off the control chamber of the carburetor 10 embodied as a diaphragm carburetor. A sheet metal billet 51 is secured to the control chamber cover 46 by means of fasting screws 53. The sheet metal billet 51 has a cover 52.

Figure 12:
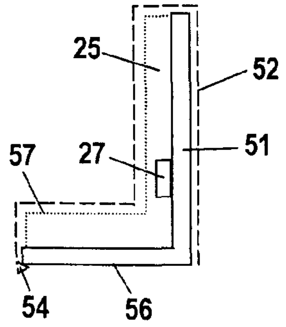
FIG. 12 is a schematic illustration of the support of FIG. 10.
Figure 10:
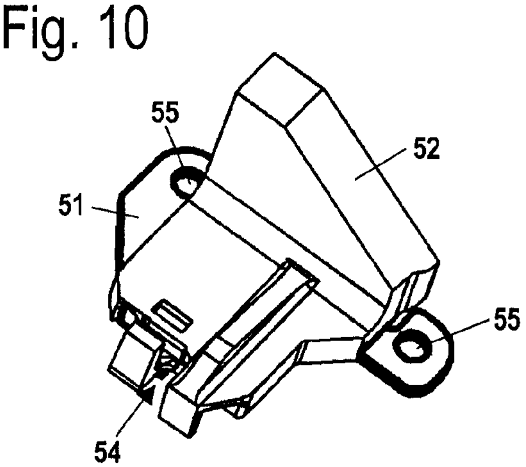
FIG. 10 is a perspective illustration of the support and cover of the control device as shown in FIG. 9.
Figure 11:
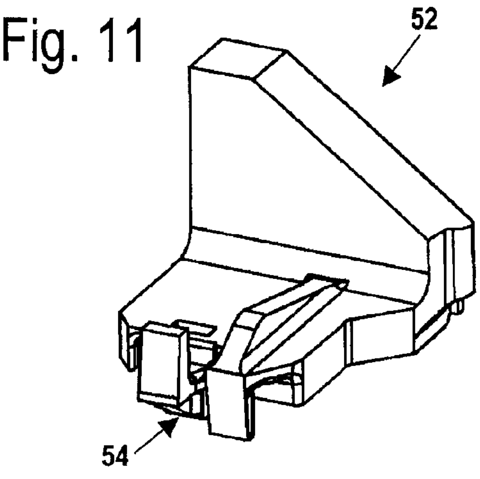
FIG. 11 is a perspective illustration of the cover of FIG. 10.

FIG. 12 shows the configuration of the sheet metal billet 51 and the cover 52 in a schematic illustration. The sheet metal billet 51 is of an angled configuration. On one leg, the sheet metal billet 51 has a contact surface 56 with which it rests against the control chamber cover 46 and is fixedly connected by means of fasting screws 53 to the cover 46. All other sides of the sheet metal billet 51 are enclosed by cover 52. The cover 52 is a plastic cap and shields the sheet metal billet 51 thermally relative to the surroundings. The cover 52 is connected by a snap-on connection in the form of a snap-on hook 54 with which it is secured on the sheet metal billet 51. The snap-on hook 54 is also illustrated in FIGS. 10 and 11. As shown in FIG. 12, space 57 is provided on the sheet metal billet 51 in which space the control device 25 is arranged. On the leg of the sheet metal billet 51 that extends upwardly from the contact surface 56, the temperature sensor 27 is arranged. The temperature sensor 27 is secured at minimal spacing relative to the contact surface 56 on the sheet metal billet 51. The temperature sensor 27 can be, for example, an NTC resistor. However, it is also possible to provide a temperature switch, for example, a bimetallic switch.

As shown in FIG. 10, the sheet metal billet 51 has sections projecting outwardly past the cover 52; these sections have fastening openings 55 with which the sheet metal billet 51 can be connected to the control chamber cover 46. The heating element 13 is arranged on the carburetor body 45 on the side of the carburetor 10 that is opposite the connecting flange 47. The thermal connection between the heating element 13 and the temperature sensor 27 is realized by means of the carburetor body 45, the control chamber cover 46, and the sheet metal billet 51. In this way, the carburetor body 45 can be already comparatively hot before the temperature sensor 27 responds. As a result of the provided engine speed-dependent control of the power supplied to the heating element 13, despite the comparatively large spacing between heating element 13 and temperature sensor 27, an excellent control of the carburetor temperature can be achieved. The temperature sensor 27 can also be configured as a bimetallic element or a similar device. The cover 52 protects the temperature sensor 27 from environmental influences. In this way, it is ensured that the temperature sensor 27 measures only the temperature of the carburetor 10.

The control of the power P supplied to a heating element 13, 33, 34 can also be realized as a function of operating parameters other than the engine speed of the drive motor 8. The operating parameter is advantageously an operating parameter that changes with the engine speed of the drive motor 8.

Figure 13:
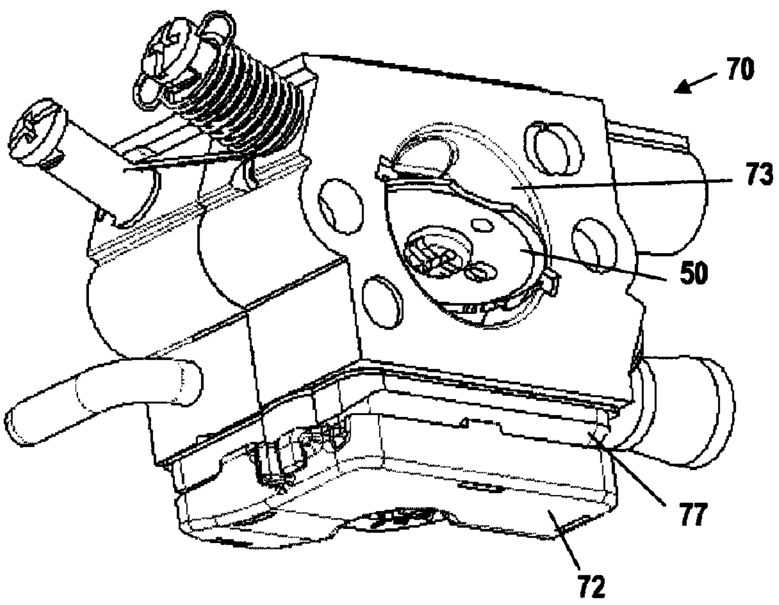
FIG. 13 is a perspective illustration of another embodiment of a carburetor.
Figure 14:
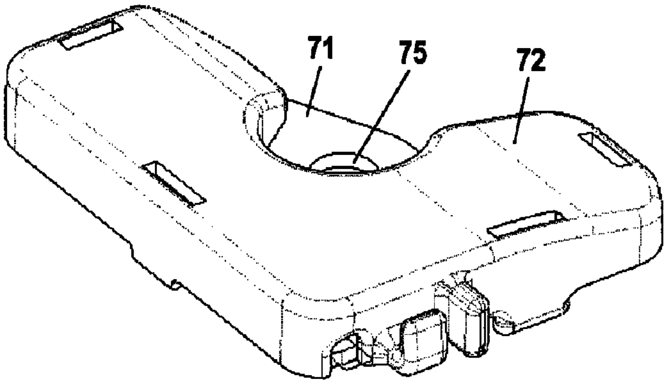
FIG. 14 is a first perspective illustration of the support and cover of the control device as shown in FIG. 13.
Figure 15:
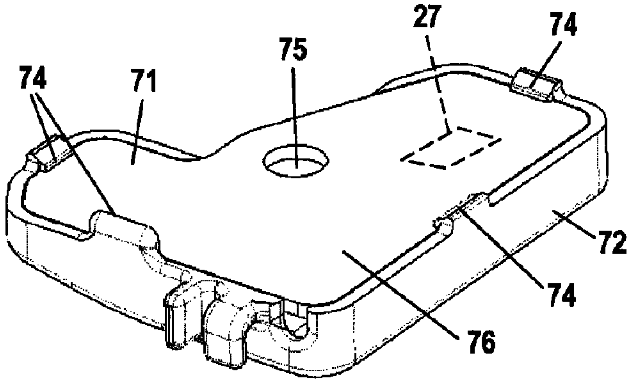
FIG. 15 is a second perspective illustration of the support and cover of the control device of FIG. 13.

FIG. 13 shows an embodiment of a carburetor 70 that is configured as a diaphragm carburetor. The carburetor 70 has an intake passage section 73 in which a choke flap 50 is pivotably supported. The intake passage downstream of the carburetor 70 is divided into a mixture passage and a supply passage. The intake passage section 73 within the carburetors 70 can also be divided into a mixture passage and a supply passage. A separately controlled supply passage can thus be eliminated. The supply passage and the mixture passage are controlled by a common throttle of the carburetor 70. The carburetor 70 has a fuel pump, not illustrated, that is covered by a pump chamber cover 77. The sheet metal billet 71, is illustrated in FIGS. 14 and 15, is secured on the pump chamber cover 77. The sheet metal billet 71 provides a support for a control device of the heating element 13. For attaching it to the pump chamber cover 77, the sheet metal billet 71 has a fastening opening 75. A fastening screw projects through the fastening opening 75 and connects also the pump chamber cover 77 to the carburetor 70.

As illustrated in particular in FIGS. 14 and 15, on the sheet metal billet 71 a cover 72 is arranged that is secured by a snap-on connection comprising a total of four snap-on hooks 74 to the sheet metal billet 71. The cover 72 is made from plastic material and covers the sheet metal billet 71 with the exception of the contact surface 76, with which the sheet metal billet 71 rests against the pump chamber cover 77, and the area of the fastening opening 75. A temperature sensor 27 is arranged on the sheet metal billet 71 as schematically indicated in FIG. 15. On the sheet metal billet 71 a control device, not illustrated, is also secured which controls at least one heating element. In this connection, the control is identical to the control of the first embodiment of the carburetor 10.

Figure 16:
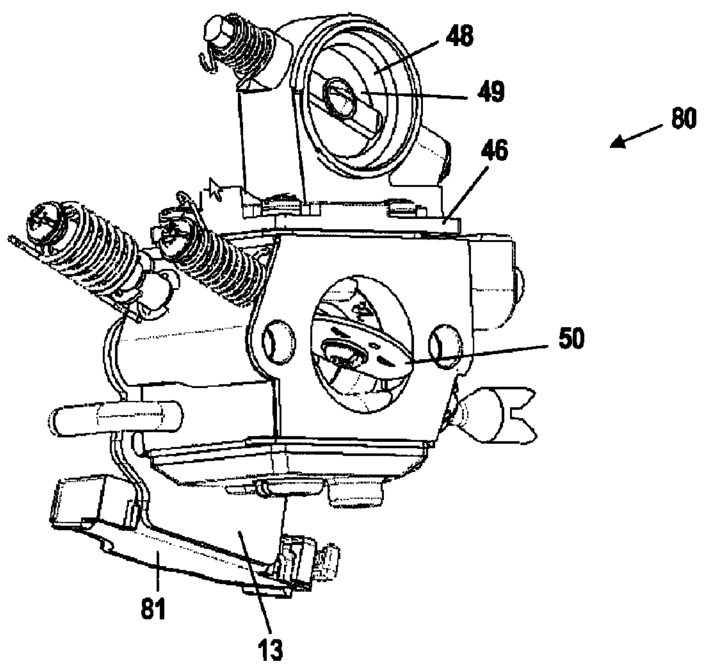
FIG. 16 is a perspective illustration of a further embodiment of a carburetor.
Figure 17:
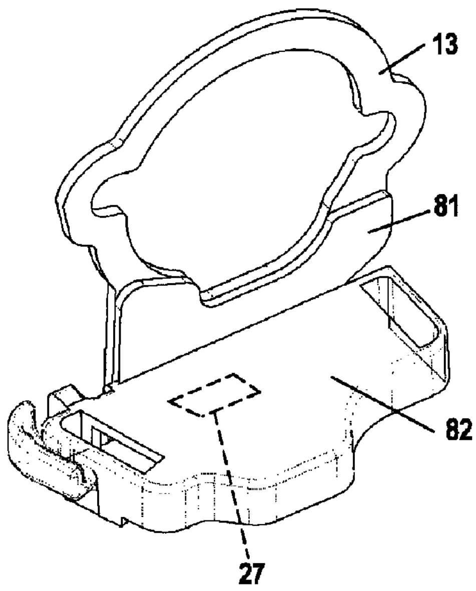
FIG. 17 is a first perspective illustration of a heating element with a support of the control device.
Figure 18:
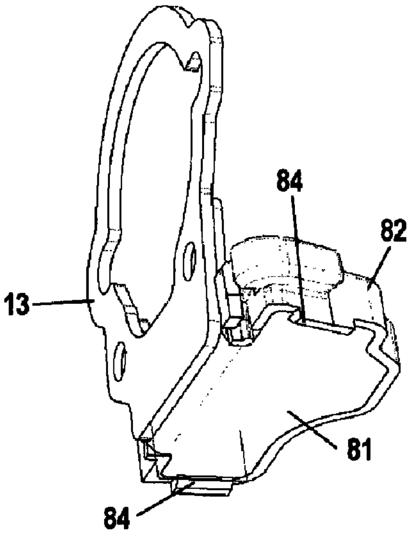
FIG. 18 is a second perspective illustration of the heating element with a support of the control device.

FIGS. 16 to 18 show a further embodiment of a carburetor 80 in which a heating element 13 is arranged. The heating element 13 is fixedly connected to a sheet metal billet 81 that supports the control device for the heating element 13. The configuration of the carburetor 80 corresponds substantially to the configuration of carburetor 10 with the exception that the supply passage section 48 is formed on the control chamber cover 46.

The sheet metal billet 81 is essentially L-shaped wherein the upwardly projecting leg of the L is arranged on the heating element 13 and the lower leg of the L supports the control device, not illustrated, as well as a temperature sensor 27 schematically indicated in FIG. 17. The lower leg of the sheet metal billet 81 is covered by cover 82 which is secured by means of a snap-on connection in the form of two snap-on hooks 84 on the sheet metal billet 81. The function of the control device corresponds to that of the first embodiment. The cover 82 covers only the topside of the lower leg of the sheet metal billet 81 that is facing the carburetor. The bottom side of this section of the sheet metal billet 81 is not covered. The cover 82 is comprised of plastic material.

The specification incorporates by reference the entire disclosure of German priority document 10 2006 037 572.6 having a filing date of 11 Aug. 2006.

While specific embodiments of the invention have been shown and described in detail to illustrate the inventive principles, it will be understood that the invention may be embodied otherwise without departing from such principles.

What is claimed is:

1. A hand-held power tool comprising:

a drive motor, a tool driven by said drive motor;

a generator driven by said drive motor, wherein a power provided by said generator increases as an engine speed of said drive motor increases;

one or more heating devices comprising one or more heating elements, wherein said generator supplies said one or more heating devices with energy;

a control device controlling a power supplied to at least one of said one or more heating elements as a function of said engine speed of said drive motor;

wherein the power supplied to said at least one heating element is reduced as a function of said engine speed relative to the power provided by said generator.

2. The power tool according to claim 1, wherein said one or more heating devices have a temperature sensor for a temperature-dependent control of said power.

3. The power tool according to claim 2, wherein said temperature sensor is an NTC resistor.

4. The power tool according to claim 2, wherein said temperature sensor is arranged at a spacing from said one or more heating elements.

5. The power tool according to claim 1, wherein said drive motor is an internal combustion engine comprising a carburetor and wherein one of said one or more heating devices is a carburetor heater.

6. The power tool according to claim 5, wherein said one or more heating devices have a temperature sensor for a temperature-dependent control of said power and wherein said temperature sensor is connected to said carburetor by a contact surface providing a thermally conducting connection.

7. The power tool according to claim 1, comprising at least one handle for guiding the power tool, wherein one of said one or more heating devices is a handle heater.

8. The power tool according to claim 1, wherein said power increases with increasing engine speed of said drive motor.

9. The power tool according to claim 1, wherein the power supplied to said at least one heating element is reduced above a limit value of said engine speed.

10. A hand-held power tool comprising:

a drive motor;

a tool driven by said drive motor;

a generator driven by said drive motor;

one or more heating devices comprising one or more heating elements, wherein said generator supplies said one or more heating devices with energy;

a control device controlling a power supplied to at least one of said one or more heating elements as a function of at least one operating parameter of said drive motor;

wherein said drive motor is an internal combustion engine comprising a carburetor and wherein one of said one or more heating devices is a carburetor heater;

wherein said one or more heating devices have a temperature sensor for a temperature-dependent control of said power and wherein said temperature sensor is connected to said carburetor by a contact surface providing a thermally conducting connection;

wherein said temperature sensor has a cover that thermally shields said temperature sensor except said contact surface.

11. The power tool according to claim 10, wherein said cover is a plastic cap.

12. The power tool according to claim 10, comprising a support wherein said control device and said temperature sensor are arranged on said support and wherein said cover is connected to said support by a snap-on connection.

13. A method for operating a heating device of a hand-held power tool comprising a drive motor, a tool driven by the drive motor, a generator driven by the drive motor, one or more heating devices each comprising one or more heating elements, wherein the generator supplies energy to the one or more heating devices; said method comprising the step of:

controlling a power supplied by a generator to at least one of the heating elements as a function of an engine speed of the drive motor and reducing the power supplied to the at least one heating element as a function of the engine speed relative to the power provided by the generator.

14. The method according to claim 13, wherein, in the step of controlling, the power is reduced above a limit value.

15. The method according to claim 13, wherein the engine speed is derived from a voltage signal of the generator.

16. The method according to claim 13, wherein the at least one operating parameter is a temperature measured by a temperature sensor.

17. A method for operating a heating device of a hand-held power tool comprising a drive motor, a tool driven by the drive motor, a generator driven by the drive motor, one or more heating devices each comprising one or more heating elements, wherein the generator supplies energy to the one or more heating devices; said method comprising the step of:

controlling a power supplied by a generator to at least one of the heating elements as a function of at least one operating parameter of the drive motor, wherein, in the step of controlling, every other half wave of a voltage signal generated by the generator is blocked from being supplied to the at least one heating element when a limit value of the at least one operating parameter is surpassed.

18. The method according to claim 17, wherein, in the step of controlling, phase control is used on the voltage signal generated by the generator.

* * * * *